Feb. 3, 1931.   C. A. HANSEN   1,791,127
SWIVEL
Filed June 10, 1926
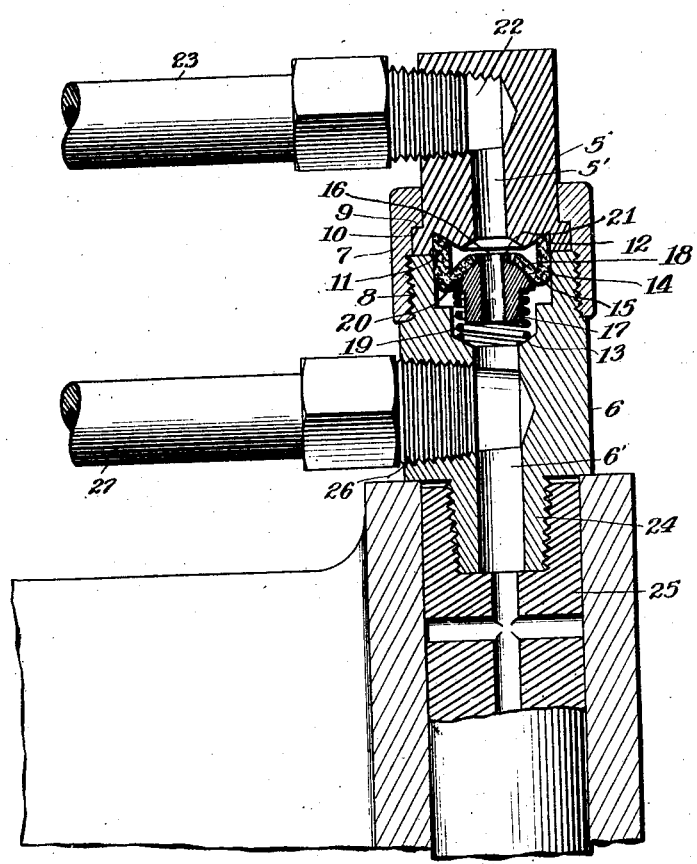
Inventor
Christian A. Hansen
By Pierce & Sweet
Attys.

Patented Feb. 3, 1931

1,791,127

UNITED STATES PATENT OFFICE

CHRISTIAN A. HANSEN, OF CHICAGO, ILLINOIS, ASSIGNOR TO ALEMITE CORPORATION, OF CHICAGO, ILLINOIS, A CORPORATION OF DELAWARE

SWIVEL

Application filed June 10, 1926. Serial No. 115,038.

My invention relates to improvements in swivels and is particularly concerned, though not limited, to improvements in the construction of swivels forming parts of lubricating systems.

The objects of my present invention are:

First, to provide a swivel comprising two body members that are connected to rotate relatively to each other and provided with communicating passageways in which simple means are provided for effectively preventing leakage through the joints between the two relatively rotating members;

Second, to provide a swivel, such as described, that is capable of withstanding comparatively high pressure;

Third, to provide a swivel, such as described, in which the two members can be rotated relatively to each other with comparative ease even though the fluid passing therethrough is under comparatively high pressure;

Fourth, to provide a swivel, such as described, embodying a gasket, preferably more or less cup-shaped, for sealing the joint between the two body members, and simple means for holding the gasket in the proper position to effect such seal; and Finally, to provide a swivel, such as described, that is simple in construction and economical to manufacture.

Other objects of my invention will appear as this description progresses, reference being had to the accompanying drawing in which I have shown my improved swivel construction in central, longitudinal section. In this drawing my invention is embodied in means for supplying lubricant to the steering knuckle of an automobile and other associated parts.

Referring to the drawing, my improved swivel comprises the two body members 5 and 6, respectively, the adjacent ends of which contact with each other and are held together by a sleeve 7 that has threaded connection with the adjacent end of the body member 6, as shown at 8, and which is provided at its other end with an inwardly directed flange 9 for engaging the shoulder 10 on the body member 5. The body members 5 and 6 are provided with communicating bores 5' and 6', respectively. By the means just described, the two body members can be held together in such manner that they may rotate relatively to each other.

The end of the body member 5, adjacent the body member 6, is counterbored to form a beveled seat 11, and a cylindrical sealing wall 12.

The other body member 6 is counterbored to form a spring seat 13 and another cylindrical sealing wall 14. A gasket 15 is confined in the chamber formed by the two counterbores and is substantially cup-shaped in cross section. This gasket is provided with a central aperture 16. A spreader 17 is like-wise housed in the space formed by the two counterbores and is provided with a spherical, or tapered, face 18 that presses against the bottom of the gasket 15 in such manner as to force the outer face of the gasket into contact with the two cylindrical sealing walls 12 and 14 and the upper edge of the gasket against the annular, beveled seat 11. The spreader 17 is yieldingly held in this position by means of the spring 19, one end of which rests upon the spring seat 13 and the other end of which abuts a shoulder 20 formed on the spreader. For the purpose of holding the spreader in its proper position, it is preferably provided with a small cylindrical extension 21 that extends into the opening 16 in the gasket.

From the above description it will readily be seen that the gasket is held in position to contact with the surfaces of both body members immediately adjacent the joint between the body members and in such manner as to preclude the escape of fluid between the body members. When fluid, under pressure, is passing through the swivel, both sides of the gasket will be subjected, more or less, to the pressure of the fluid, but the resultant of the pressures thus exerted on the opposite sides of the gasket is in such direction that it tends to hold the gasket in the position shown. The spreader and the spring prevent the displacement of the gasket relatively to the body members when there is no fluid pressure to hold it in position, and also add their pressure to that of the fluid to hold the gasket in place when fluid is passing through the swivel.

I have here shown the body member 5 as being provided with a single inlet passageway 22 that may be connected with a source of lubricant, or other fluid under pressure, by means of the pipe 23, and have shown the body member 6 as comprising a threaded extension, or nipple, 24 connected with the upper end of a steering knuckle pin 25 so as to supply lubricant thereto.

The bore 6' of the body member 6 has an outlet opening for receiving the threaded nipple 26 that is connected with the pipe 27. This pipe may lead to other portions of the mechanism that are to be lubricated and which are stationary relative to the pin 25. The pipe 23 may be connected with a portion of the mechanism that moves about the axis of the pin 25 without in any way disturbing the supply of lubricant to the pin 25 and the pipe 27 and its associated parts.

While I have described the details of construction of the preferred embodiment of my invention, it is to be clearly understood that my invention is not limited to these details, but is capable of other adaptations and modifications within the scope of the appended claims.

Having thus described my invention, what I claim is:

1. In lubricating apparatus of the class described, a swivel comprising two body members having contacting extremities forming a swivel joint, said body members being provided with co-axial bores having contiguous sealing walls jointly forming a cylindrical sealing surface, a cup-shaped gasket having its outer surface contacting with said cylindrical sealing surface on both sides of said joint, a spreader axially movable in one of said bores for urging the outer surface of said gasket against said sealing surface, and resilient means tending to move said spreader in one direction.

2. A swivel comprising two body members connected to rotate relatively to each other, said body members having communicating bores, the adjacent ends of said body members being counterbored, the one to form a cylindrical sealing wall terminating in an annular beveled seat and the other to form a spring seat and a cylindrical sealing wall, an apertured substantially cup-shaped gasket having its outer face in contact with said sealing walls and adapted to be pressed thereagainst by fluid pressure, a spreader having a tapered face contacting with the bottom of said gasket, and a spring having one end on said spring seat and its other end pushing against said spreader to force an edge of said gasket against said annular beveled seat.

3. A swivel comprising two body members, means for rotatably connecting said body members, said body members having communicating bores, the adjacent ends of said body members being counterbored, the one to form a cylindrical sealing wall and the other to form a cylindrical sealing wall and an apertured, annular seating surface to extend at an angle to said last named sealing wall, a cup-shaped gasket for engaging said cylindrical sealing walls and said annular seating surface, and resilient means for yieldingly holding said gasket in contact with said cylindrical sealing walls and said annular seating surface.

In witness whereof, I hereunto subscribe my name, this 3rd day of June, 1926.

CHRISTIAN A. HANSEN.